(12) United States Patent
Xiong et al.

(10) Patent No.: US 11,366,602 B2
(45) Date of Patent: Jun. 21, 2022

(54) DATA STORAGE DEVICE WITH BURN-AFTER-READ MODE

(71) Applicant: Western Digital Technologies, Inc., San Jose, CA (US)

(72) Inventors: Shaomin Xiong, Fremont, CA (US); Toshiki Hirano, San Jose, CA (US); William B. Boyle, Lake Forest, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 13 days.

(21) Appl. No.: 16/909,018

(22) Filed: Jun. 23, 2020

(65) Prior Publication Data

US 2021/0397361 A1 Dec. 23, 2021

(51) Int. Cl.
*G06F 3/06* (2006.01)
*G06F 11/10* (2006.01)

(52) U.S. Cl.
CPC .......... *G06F 3/0652* (2013.01); *G06F 3/0619* (2013.01); *G06F 3/0623* (2013.01); *G06F 3/0653* (2013.01); *G06F 3/0659* (2013.01); *G06F 3/0676* (2013.01); *G06F 3/0679* (2013.01); *G06F 11/1044* (2013.01); *G06F 11/1068* (2013.01)

(58) Field of Classification Search
CPC .. G06F 3/0652; G06F 3/0676; G06F 11/1044; G06F 3/0623; G06F 3/0619; G06F 3/0659; G06F 11/1068; G06F 3/0653
See application file for complete search history.

(56) References Cited

U.S. PATENT DOCUMENTS

| | | | |
|---|---|---|---|
| 7,107,388 B2 | 9/2006 | Zimmer et al. | |
| 7,256,962 B2 | 8/2007 | Tateishi | |
| 7,370,367 B2 | 5/2008 | Constantinou et al. | |
| 9,230,689 B2 | 1/2016 | Tuers et al. | |
| 9,251,257 B2 * | 2/2016 | Johnson | G11B 27/105 |
| 9,257,145 B1 | 2/2016 | Soderbloom et al. | |
| 10,366,714 B1 | 7/2019 | Olson et al. | |

(Continued)

FOREIGN PATENT DOCUMENTS

| | | |
|---|---|---|
| CN | 104391659 A | 3/2015 |
| CN | 106354425 A | 1/2017 |
| CN | 112130769 A | 12/2020 |

OTHER PUBLICATIONS

Xiong et al. "Investigation of the Local Temperature Increase for Heat Assisted Magnetic Recording (HAMR)," IEEE Transactions on Magnetics, vol. 50, No. 4, Apr. 2014, 6 pages, DOI: 10.1109/TMAG.2013.2290760.

(Continued)

*Primary Examiner* — David Yi
*Assistant Examiner* — Dustin B. Fulford
(74) *Attorney, Agent, or Firm* — Patterson + Sheridan, LLP; Steven H. VerSteeg

(57) ABSTRACT

A data storage device is disclosed comprising a non-volatile storage medium (NVSM), and a head configured to access the NVSM. During a first interval, the head is used to write first data to a first segment of the NVSM, and during a second interval, the head is used to read the first data from the first segment of the NVSM and erase at least part of the first data from the first segment of the NVSM.

16 Claims, 4 Drawing Sheets

(56) References Cited

U.S. PATENT DOCUMENTS

| | | |
|---|---|---|
| 10,679,650 B2 | 6/2020 | Bai et al. |
| 10,921,992 B2 | 2/2021 | Li |
| 10,936,003 B1 | 3/2021 | Wu et al. |
| 2006/0203693 A1 | 9/2006 | Aoyama |
| 2008/0239548 A1 | 10/2008 | Paul et al. |
| 2014/0082752 A1* | 3/2014 | Helak ................. G06F 21/6272 726/30 |
| 2016/0246967 A1 | 8/2016 | Gross et al. |
| 2019/0391748 A1 | 12/2019 | Li |
| 2020/0272339 A1* | 8/2020 | Oberg ................ G11B 20/1217 |

OTHER PUBLICATIONS

Gonzalez "Hot Data vs Cold Data: It's Influence on Data Placement Decisions & What to Do About It," Hot Data vs. Cold Data: Influence on Data Placement Decisions [Webcast], DataCore Software, Jun. 23, 2022, Accessed Feb. 7, 2022, 17 pages, <https://www.datacore.com/event/hot-data-vs-cold-data/>.

\* cited by examiner

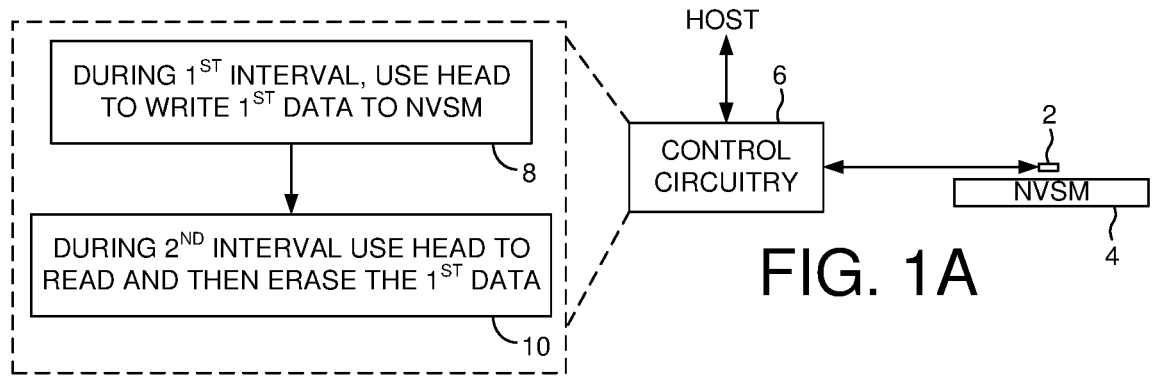
FIG. 1A
FIG. 1B
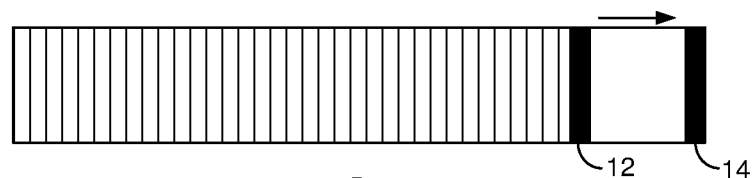
FIG. 2A
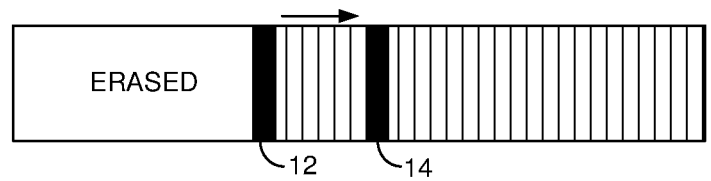
FIG. 2B
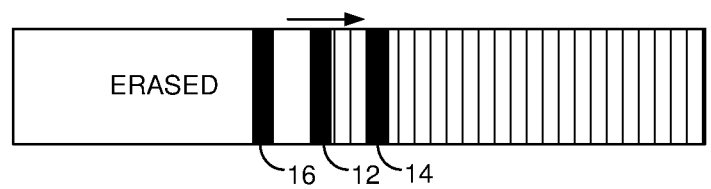
FIG. 2C
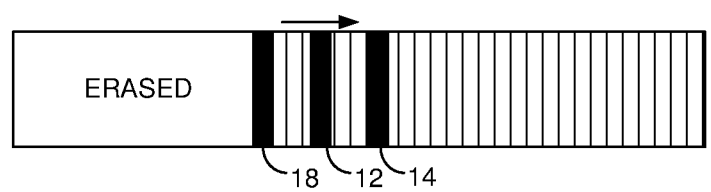
FIG. 2D

DATA STORAGE DEVICE WITH BURN-AFTER-READ MODE

BACKGROUND

Data storage devices, such as disk drives, tape drives, and solid state drives, include one or more types of non-volatile storage mediums, such as a magnetic disk, a magnetic tape, an optical disk, or a non-volatile semiconductor memory. With magnetic recording, data is typically written to a magnetic medium by modulating a write current in an inductive coil (write coil) to record magnetic transitions representing the recorded data. During read-back, the magnetic transitions are sensed by a read element (e.g., a magneto-resistive element) and the resulting read signal demodulated by a suitable read channel. Heat assisted magnetic recording (HAMR) is a recent development that improves the quality of written data by heating the magnetic medium during write operations in order to decrease the coercivity, thereby enabling the magnetic field generated by the write coil to more readily magnetize the magnetic medium. Any suitable technique may be employed to heat the surface of the magnetic medium in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the magnetic medium close to the resonant frequency of the magnetic grains, thereby enabling the magnetic field generated by the write coil to more readily magnetize the magnetic medium.

BRIEF DESCRIPTION OF THE DRAWINGS

FIG. 1A shows a data storage device according to an embodiment comprising a head configured to access a non-volatile storage medium (NVSM).

FIG. 1B is a flow diagram according to an embodiment wherein when reading data from the NVSM using the head, the head also erases the data in an atomic operation.

FIG. 2A shows data written to a segment of the NVSM using a head according to an embodiment comprising a write element and a read element.

FIG. 2B shows an embodiment wherein the write element is used to erase data during a read operation.

FIG. 2C shows an embodiment wherein the head comprises a write assist element configured to erase data during a read operation.

FIG. 2D shows an embodiment wherein the head comprises an erase element configured to erase data during a read operation.

DETAILED DESCRIPTION

Figure 3:
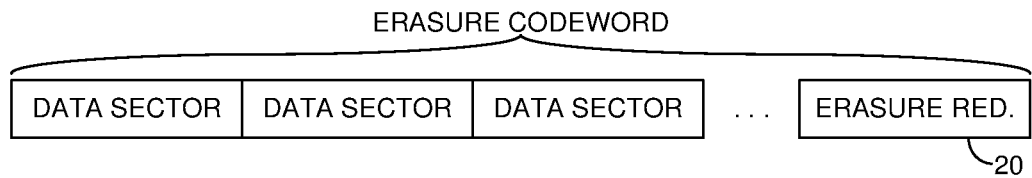
FIG. 3 shows an embodiment wherein erasure redundancy is generated over a plurality of data sectors to form an erasure codeword.

FIG. 1A shows a data storage device according to an embodiment comprising a head 2 actuated over a non-volatile storage medium (NVSM) 4. The data storage device further comprises control circuitry 6 configured to execute the flow diagram of FIG. 1B, wherein during a first interval data is written to a first segment of the NVSM (block 8), and during a second interval, the data is read from the first segment and at least partially erased from the first segment (block 10).

In the embodiments described herein any suitable NVSM 4 may be accessed by the head 2, such as an optical disk, magnetic disk, magnetic tape, etc. In one embodiment, the NVSM 4 is indirectly accessed by mapping logical block addresses (LBAs) to physical block addresses (PBAs) representing physical data sectors of the NVSM 4. In certain applications where it is desirable to erase or "burn" data after it has been read from the NVSM 4 (e.g., for security or privacy reasons), it has been suggested to delete or modify the LBA to PBA mapping so that the corresponding data sectors are no longer accessible. However, deleting or modifying the LBA mapping does not actually erase the data from the physical data sectors, thereby leaving the recorded data discoverable through various hacking techniques (e.g., hacking the firmware or the LBA/PBA mapping data).

In one embodiment, in order to ensure that a read-once data sector is truly erased from the NVSM 4, the control circuitry 6 configures the head 2 to erase the recorded data during the read operation. FIG. 2A shows an embodiment wherein the head 2 comprises a suitable write element 12 and a suitable read element 14, wherein when accessing the NVSM 4 the head 2 may be moved relative to the NVSM 4 (e.g., scanning the head 2 across the NVSM 4), or the NVSM 4 may be moved relative to the head 2 (e.g., by spinning a disk of a disk drive or winding a tape reel of a tape drive). In the example of FIG. 2A, data is written to a segment of the NVSM 4, for example, by modulating the write current of a write coil. In one embodiment, the read element 14 leads the write element 12 which facilitates using the write element 12 to erase the data during a read operation as shown in FIG. 2B. That is during a read operation, the read element 14 reads the data recorded in a segment of the NVSM 4, and then the trailing write element 12 is configured to immediately erases the recorded data as shown in FIG. 2B.

Any suitable write element 12 may be used to erase the recorded data during a read operation, wherein in one embodiment the write element may be a write coil used to write magnetic transitions on a magnetic storage medium. For example, in one embodiment the data may be erased by applying a DC or AC write current to the write coil, or by applying a random write current to the write coil in order to overwrite and thereby erase the previously recorded data. In another embodiment shown in FIG. 2C, the write element 12 may comprise a write assist element, such as a laser in HAMR or a STO in MAMR, which is used to assist a write coil 16 in writing magnetic transitions onto a magnetic medium. For example, in one embodiment erasing data during a read operation using the write coil 16 may not be feasible since it may induce noise into the read signal. Accordingly in one embodiment, instead of energizing a write coil to erase data, power is applied to the write assist element 12 to erase the data during a read operation without energizing the write coil 16 so as to avoid inducing noise into the read signal. In yet another embodiment shown in FIG. 2D, the head 2 may comprise a read element 14, a write element 12, and an erase element 18, wherein the erase element 18 is configured to erase the data during a read operation.

Figure 4A:
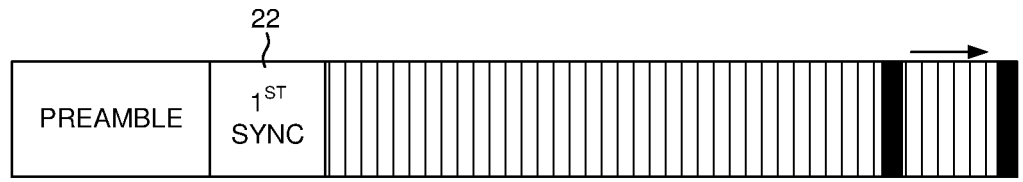
FIG. 4A shows an embodiment wherein when writing to a data sector, a first sync mark is written to the data sector.
Figure 4B:
FIG. 4B shows an embodiment wherein when erasing a data sector, a second sync mark is written to the data sector.

In one embodiment shown in FIG. 3, each data sector may be encoded using a suitable sector level error correction code (ECC), for example, using a low density parity check (LDPC) code. In addition, erasure redundancy 20 may be generated over a plurality of the data sectors to form an erasure codeword, wherein the erasure redundancy 20 may be used to recover a predetermined number of corrupted data sectors. Any suitable erasure redundancy 20 may be generated over the plurality of data sectors, such as a hard or soft parity sector(s). In one embodiment, since the erasure redundancy 20 is capable of recovering a corrupted data sector, it is also capable of recovering an erased data sector that has been erased in connection with a read operation. In one embodiment in order to distinguish between a corrupted data sector and an erased data sector, a special sync mark may be written to an erased data sector. FIG. 4A shows an example of this embodiment wherein when data is written to a data sector, a first sync mark is 22 is written (after a preamble) wherein the first sync mark 22 is used to symbol synchronize to the symbols of the data sector. When the data sector is erased, a second sync mark 24 is written to the data sector which is different from the first sync mark 22. In this manner if the control circuitry 6 attempts to read the data sector and detects the second sync mark 24, the control circuitry 6 will recognize the data sector as an erased data sector and, for example, take any suitable action to prevent the erased data from being reconstructed using the erasure redundancy 20.

Figure 5:
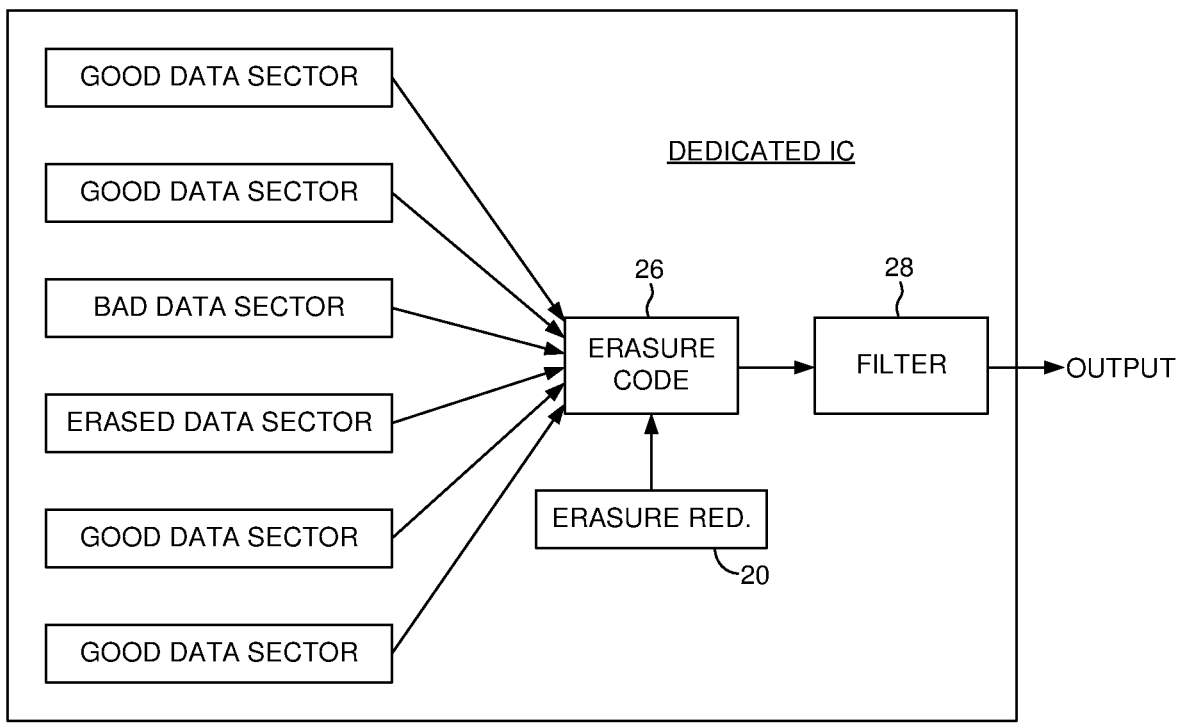
FIG. 5 shows an embodiment wherein an erasure code decoder comprises a filter for preventing erased data from exiting the decoder.

In one embodiment, the sync mark detection and the ECC decoding (including the erasure code decoding) is implemented within a dedicated integrated circuit (IC), such as a read channel IC. In this manner, an erased data sector cannot be recovered subversively, for example, by a hacker changing the LBA to PBA mapping information. FIG. 5 shows an example of this embodiment wherein the erasure redundancy 20 may be capable of recovering two data sectors unrecoverable at the sector level, where in this example one data sector is corrupted (e.g., by a defect on the NVSM 4), and one data sector has been erased during a read operation. The good data sectors (recovered using the sector level ECC) and the erased data sector are processed by an erasure code decoder 26 in order to recover the bad data sector as well as the erased data sector (the erased data sector being processed as erasure pointers). Having recovered the bad data sector, the corresponding data may be output by the dedicated IC, whereas the data recovered for the erased data sector is prevented from leaving the dedicated IC (e.g., using a suitable filter 28).

Figure 6:
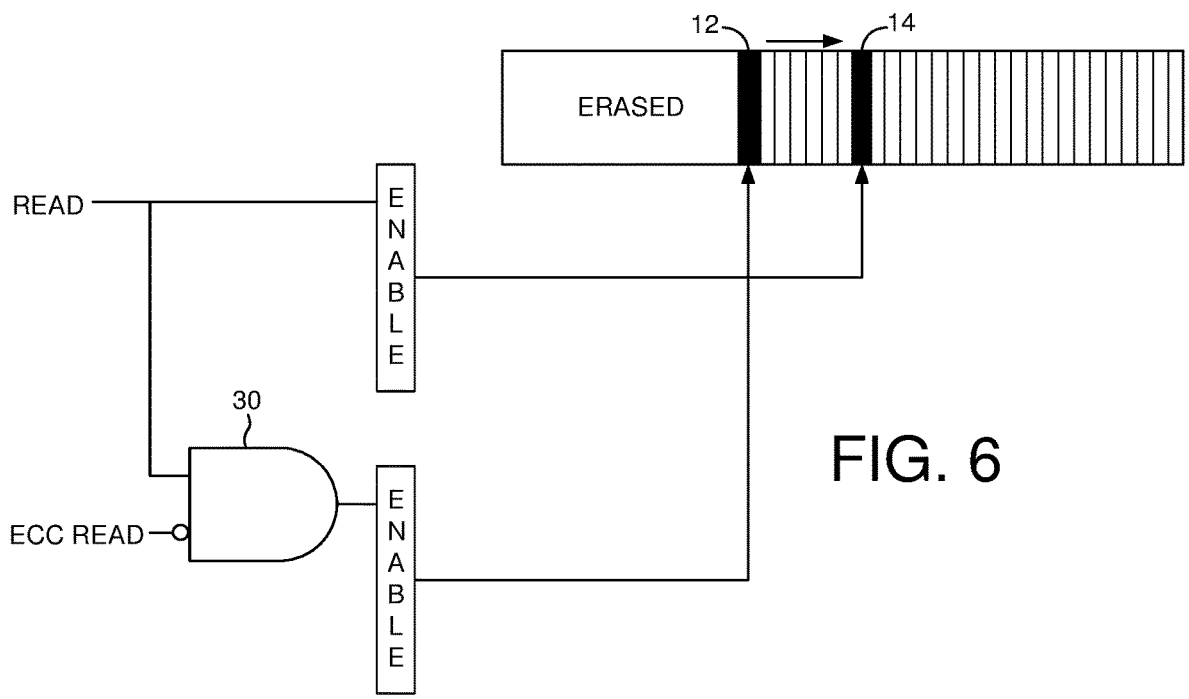
FIG. 6 shows an embodiment wherein a read/ECC gate is configured to disable the write element when reading data as part of an error correction code (ECC) read.

In one embodiment, it may be necessary to read a read-once data sector in order to recover a corrupt data sector using the erasure redundancy 20 as in the example described above with reference to FIG. 5. When reading a read-once data sector as part of an ECC read, the data sector is not erased but the data is also prevented from leaving the data storage system (e.g., using the filter 28 within the dedicated IC of FIG. 5). FIG. 6 shows an embodiment wherein the control circuitry 6 enables the write element 12 during a host read of a read-once data sector so that the data sector is erased. In this embodiment, a read/ECC gate 30 is configured to disable the write element 12 when reading a read-once data sector as part of an error correction code (ECC) read. In one embodiment, the circuitry of FIG. 6 is integrated into a dedicated IC such as described above with reference to FIG. 5 so that the read-once facility cannot be subverted by a simple firmware hack.

Figure 7:
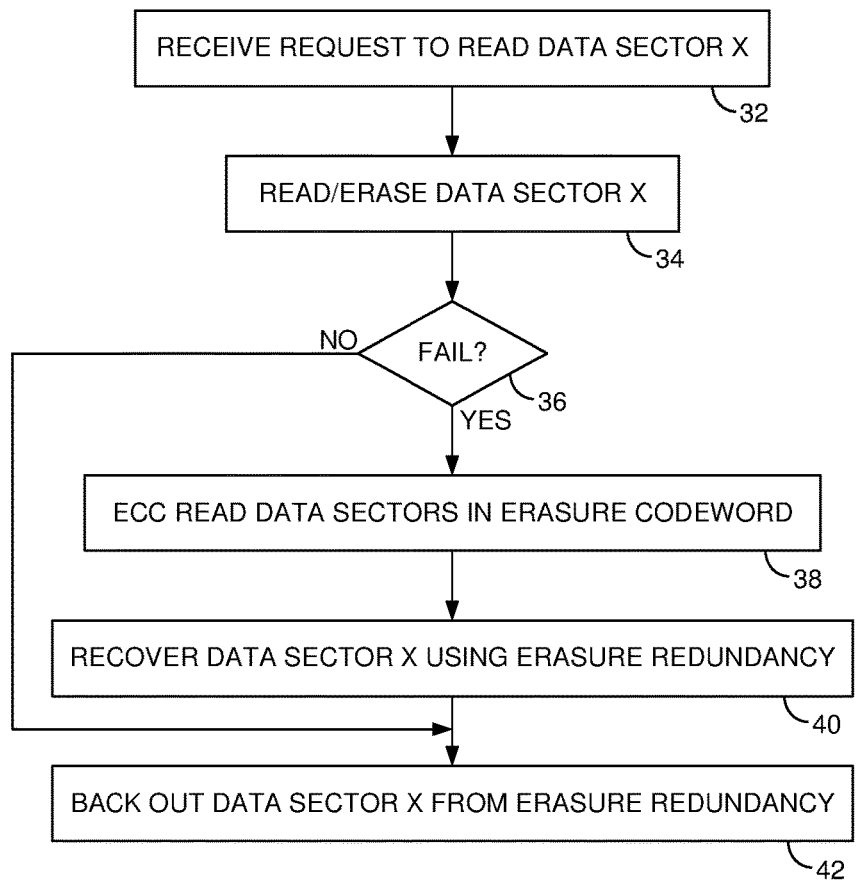
FIG. 7 is a flow diagram according to an embodiment wherein after reading/erasing a data sector, the erasure code redundancy is updated by backing out the erased data.

In one embodiment, when a read-once data sector is erased in connection with a host read operation, the erasure redundancy 20 that covers the erased data sector is updated in order to "back out" the erased data sector from the erasure redundancy 20. In this manner, once an erased data sector has been backed out of the erasure redundancy 20, the erased data sector becomes truly erased since there is no longer any way to recover the erased data sector. The erased data sector may be backed out of the erasure redundancy 20 in any suitable manner, such as by regenerating the erasure redundancy 20 over the remaining (un-erased) data sectors, or by combining the data read from the erased data sector with the erasure redundancy 20 so as to back out the contribution. FIG. 7 is a flow diagram illustrating an example of this embodiment wherein when a request is received from the host to read a read-once data sector X (block 32), the data sector X is read and erased (block 34). If the read of data sector X fails due to a failure of the sector level ECC (block 36), the data sectors of the corresponding erasure codeword are ECC read (block 38) and the erasure redundancy 20 is used to recover the data sector X (block 40). The recovered data sector is then backed out of the erasure redundancy 20 so that the data sector X becomes truly erased (block 42).

In one embodiment, the erasure redundancy 20 may be updated by backing out an erased data sector during the read operation by regenerating the erasure redundancy 20 over the remaining (un-erased) data sectors. That is, when reading data sector X the other un-erased data sectors that are part of the erasure codeword are also ECC read during the read operation so that the erasure redundancy 20 can be regenerated (without the erased data sector X). In another embodiment, the update of the erasure redundancy 20 may be deferred to some time after the read of data sector X, for example, as part of a background operation. Accordingly in one embodiment, the data sector X may be written using three different sync marks. A first sync mark may be written to data sector X during a write operation such as shown in FIG. 4A, a second sync mark may be written to data sector X to indicate the data sector has been erased but not backed out of the erasure redundancy 20, and a third sync mark may be written to data sector X to indicate the data sector has been erased and backed out of the erasure redundancy 20. In this embodiment when the control circuitry is recovering a bad data sector using the erasure redundancy 20, any data sector detected to have the third sync mark is excluded from the erasure code decoding. Accordingly in this embodiment, employing different sync marks to identify the erased data sectors provides additional protection against subverting the read-once facility since the sync mark detector may be implemented within a dedicated IC such as shown in FIG. 5 (as opposed to using the LBA mapping to identify erased data sectors).

Figure 8A:
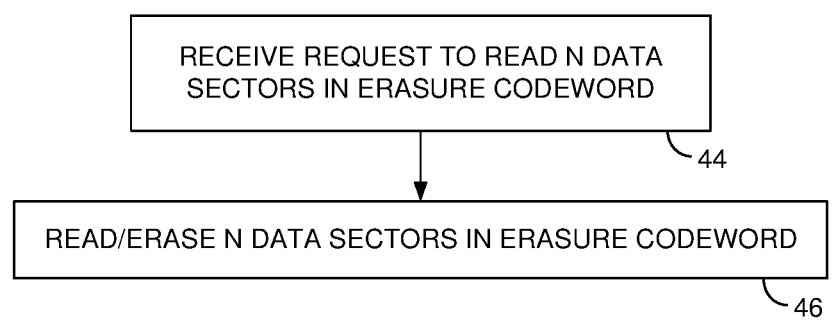
FIG. 8A is a flow diagram according to an embodiment wherein a data sector is erased when a sufficient number of data sectors of an erasure codeword are read/erased to render the data unrecoverable using the erasure code redundancy.
Figure 8B:
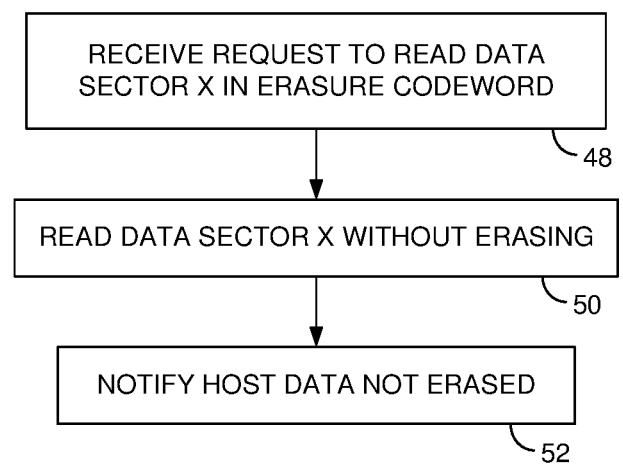
FIG. 8B is a flow diagram according to an embodiment wherein when reading a data sector that will be recoverable using the erasure code redundancy, the data sector is not erased and the host is sent a notification that the data was not erased.

In another embodiment, a read-once data sector that is part of an erasure codeword is not erased during a read unless a sufficient number of the data sectors within the erasure codeword are also read/erased during the same read operation to have rendered the erasure redundancy 20 ineffective. For example, in an embodiment wherein the erasure redundancy 20 is capable of recovering up to two data sectors, a read-once data sector is not read/erased unless at least one other data sector in the erasure codeword is also read/erased during the same read operation. FIG. 8A is a flow diagram according to this embodiment wherein when a request is received from the host to read N data sectors in an erasure codeword (block 44) where N exceeds the correction power of the erasure codeword, the N data sectors are read/erased during a read operation (block 46). In this manner the N data sectors are truly erased since the erasure redundancy 20 becomes unable to recover the erased data sectors. Conversely in the flow diagram of FIG. 8B, when a request is received from the host to read a data sector X in an erasure codeword (block 48), the data sector is read without being erased (block 50) since the erasure redundancy 20 is still capable of recovering the erased data sector, and therefore the data sector is not truly erased. In one embodiment, the data storage device may notify the host when a data sector has been read but not erased (block 52). In the embodiment of FIG. 8A when the N data sectors are read/erased, the erased data may be backed out of the erasure redundancy 20 as described above, thereby enabling the erasure redundancy 20 to continue covering the remaining un-erased data sectors in the erasure codeword.

In some embodiments when a read-once data sector is read/erased, substantially the entire data sector may be erased, for example, by using a write coil or a write assist element. In another embodiment when a read-once data sector is read/erased, only part of the data sector is erased in a manner that renders it unrecoverable using the sector level ECC. For example, in one embodiment the sync mark of the data sector may be erased to prevent synchronizing to the symbols of the data sector. In another embodiment, a predetermined number of symbols within the data sector may be erased which exceeds the correction power of the sector level ECC. In one embodiment, erasing less than the entire data sector may help preserve the life of a write assist element when used to perform the erase operation. For example, the operating life of a laser in a HAMR storage device may be limited, and so limiting the laser's operation when erasing a data sector helps increase the longevity of the laser.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

It is to be understood that the embodiments discussed herein are applicable to a data storage device such as a hard disk drive (HDD) as well as a tape drive such as a tape embedded drive (TED) or an insertable tape media drive. An example TED is described in patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a non-volatile storage medium (NVSM);
a head configured to access the NVSM, wherein the head comprises:
  a read element configured to read data from the NVSM; and
  a write element configured to write data to the NVSM; and
control circuitry configured to:
  during a first interval, use the head to write first data to a first segment of the NVSM; and
  during a second interval, use the head to read the first data from the first segment of the NVSM and erase at least part of the first data from the first segment of the NVSM, wherein the control circuitry comprises a gate configured to disable the write element when reading the first data from the first segment as part of an error correction code (ECC) read.

2. The data storage device as recited in claim 1, wherein the write element comprises a write coil.

3. The data storage device as recited in claim 1, wherein the write element comprises a write assist element.

4. The data storage device as recited in claim 1, wherein the head comprises the read element configured to read the NVSM, the write element configured to write the first data to the first segment of the NVSM, and an erase element configured to erase the first data from the first segment of the NVSM.

5. The data storage device as recited in claim 1, wherein the control circuitry is further configured to:
  write a first sync mark to the first segment of the NVSM when writing the first data; and
  write a second sync mark to the first segment of the NVSM indicating that the first data has been erased, wherein the second sync mark is different from the first sync mark.

6. The data storage device as recited in claim 1, wherein the control circuitry is further configured to:
  generate an erasure code redundancy over at least the first data written to the first segment and second data written to a second segment of the NVSM; and
  update the erasure code redundancy based on the erased first data.

7. The data storage device as recited in claim 1, wherein the control circuitry is further configured to:
  generate an erasure code redundancy over at least the first data written to the first segment and second data written to a second segment of the NVSM;
  during the first interval, read the first data from the first segment without reading the second data from the second segment and without erasing the first data from the first segment; and
  during the second interval, read the first data from the first segment and the second data from the second segment and erase the first data from the first segment and the second data from the second segment.

8. A data storage device comprising:
a non-volatile storage medium (NVSM);
a head configured to access the NVSM, wherein the head comprises:
  a read element configured to read data from the NVSM; and
  a write element configured to write data to the NVSM; and
control circuitry configured to:
  use the head to write first data to a first segment of the NVSM and second data to a second segment of the NVSM;
  generate erasure code redundancy over the first data and the second data;
  use the head to read the first data from the first segment of the NVSM and the second data from the second segment of the NVSM;
  erase at least part of the first data from the first segment of the NVSM; and
  update the erasure code redundancy based on the erased first data, wherein the control circuitry comprises a gate configured to disable the write element when reading the first data from the first segment and second data from the second segment as part of an error correction code (ECC) read.

9. The data storage device as recited in claim 8, wherein:
the control circuitry is further configured to use the write element to erase the first data from the first segment of the NVSM.

10. The data storage device as recited in claim 9, wherein the write element comprises a write coil.

11. The data storage device as recited in claim 9, wherein the write element comprises a write assist element.

12. The data storage device as recited in claim 8, wherein the head comprises the read element configured to read the NVSM, the write element configured to write the first data to the first segment of the NVSM, and an erase element configured to erase the first data from the first segment of the NVSM.

13. The data storage device as recited in claim 8, wherein the control circuitry is further configured to:
  write a first sync mark to the first segment of the NVSM when writing the first data; and
  write a second sync mark to the first segment of the NVSM indicating that the first data has been erased, wherein the second sync mark is different from the first sync mark.

14. The data storage device as recited in claim 8, wherein the control circuitry is further configured to:
  during a first interval, read the first data from the first segment without reading the second data from the second segment and without erasing the first data from the first segment; and
  during a second interval, read the first data from the first segment and the second data from the second segment and erase at least part of the first data from the first segment and at least part of the second data from the second segment.

15. The data storage device as recited in claim 8, wherein the control circuitry is further configured to update the erasure code redundancy by backing out the first data from the erasure code redundancy.

16. A data storage device comprising:
a non-volatile storage medium (NVSM);
a head configured to access the NVSM;
a means for writing a first data to a first segment of the NVSM;
a means for reading a first data from the first segment of the NVSM;
a means for erasing at least part of the first data from the first segment of the NVSM; and
a means for disabling the means for writing a first data to a first segment of the NVMS when reading the first data from the first segment of the NVSM as part of an ECC read.

* * * * *